April 29, 1947.  F. E. TAYLOR  2,419,921

ELECTRIC WELDING MACHINE

Filed April 16, 1945

INVENTOR.
FLOYD E. TAYLOR
BY
Whittemore Hulbert & Belknap
ATTORNEYS

Patented Apr. 29, 1947

2,419,921

UNITED STATES PATENT OFFICE 2,419,921

ELECTRIC WELDING MACHINE

Floyd E. Taylor, Birmingham, Mich., assignor to Swift Electric Welder Company, Detroit, Mich., a corporation of Michigan Application April 16, 1945, Serial No. 588,558

4 Claims. (Cl. 219—4)

The invention relates to electric welding machines of that type in which the work is placed between clamping electrodes relatively movable upon a supporting bed. With such constructions one of the electrodes must be insulated from the bed and, consequently, is generally mounted in fixed relation thereto. The other electrode is movable upon slideways on the bed towards or from the fixed electrode. During the progress of the welding a certain amount of molten material will drop from the weld and this, if permitted to accumulate on the bed or the slideways, may build up a bridge short-circuiting the insulated electrode or destroying the insulation thereof.

It is the object of the instant invention to avoid this defect and to provide means for protecting the insulation and maintain the effectiveness thereof. To this end the invention consists in the construction as hereinafter set forth.

Figure 2:
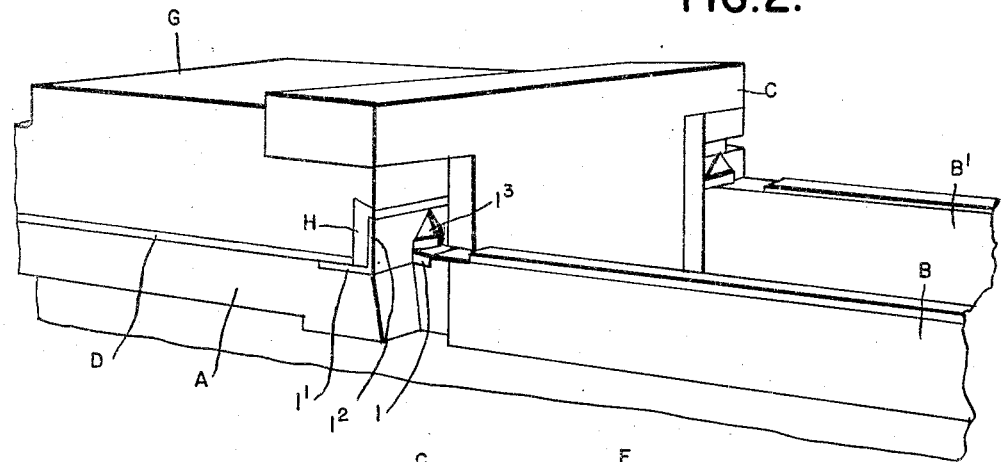
Fig. 2 is a perspective view of a portion of the bed, the insulated electrode supported thereon and the protecting means for the insulation.
Figure 1:
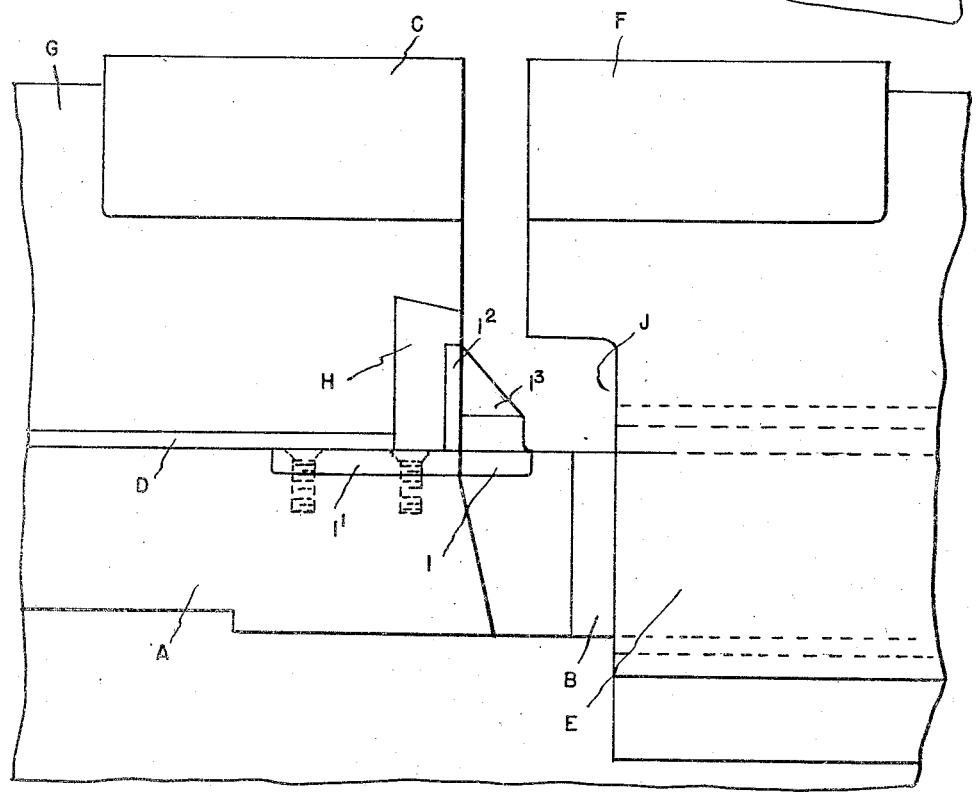
Fig. 1 is a side elevation of an electric welding machine showing my improvements applied thereto.

The general construction of the welding machine is not the subject matter of the instant invention but, as illustrated, it comprises a bed member A having spaced slideways B and B' thereon, a stationary electrode C extending across said slideways and downward between the same, and a sheet of insulating material between said electrode and the bed. Upon the ways B is supported a movable carriage E which has mounted thereon a cooperating electrode F. This has a face parallel to and opposite the face of the electrode C and the work to be welded is clamped between these faces. With the construction as thus far described it will be obvious that any molten material dropping from the weld will fall either in the space between the ways B and B' or upon these ways. In the latter case a bridge will be built up which eventually will short-circuit across the insulation D forming an electrical connection between the electrode C and bed. To avoid such result I have devised the following construction.

The electrode C is mounted on a supporting member G which latter rests upon the insulator plate D. The member G is cut away in its forward portion to form a recess above each of the ways B and B' and in this recess is placed insulating material H. To protect such insulating material and to hold it in position, there is a member I, preferably a casting which is of angle form, having a base portion I' extending beneath the insulator plate D and located in a cut-away portion of the way B. There is also an upwardly extending angle portion $I^2$ which is in front of the insulation H and preferably in a recess therein but this member does not extend up to the full height of the insulation H and so does not short-circuit the same. Thus, any short-circuiting bridge built up from molten material would need to rise above the ways the full height of the insulation H. However, to avoid even this bridging effect, the member I is provided in front of the portion $I^2$ thereof with a deflector portion $I^3$ having oblique faces for deflecting any molten material dropping thereon to opposite sides of the ways. Also the carriage E is cut away at J to form a recess opposite the deflector $I^3$ so that no contact will be made between the carriage and member I even when the electrodes F and C are in contact with each other.

With the construction as above described there is no danger of short-circuiting the insulated electrode or of injuring or destroying the insulation therefor.

What I claim as my invention is:

1. In an electric welding machine, the combination with a bed formed of electrically conductive material and clamping electrodes mounted thereon to be relatively movable towards or from each other, of insulation between said bed and one of said electrodes having a portion extending upward from the bed adjacent to the contacting face of said electrode.

2. In an electric welding machine, the combination with a bed formed of electrically conductive material and clamping electrodes mounted thereon to be relatively movable towards or from each other, of insulation between said bed and one of said electrodes having a portion extending upward adjacent to the face of the latter, and a protecting shield for said portion.

3. In an electric welding machine, the combination with a bed formed of electrically conductive material and clamping electrodes mounted thereon to be relatively movable towards or from each other, of insulation between said bed and one of said electrodes having a portion extending upward adjacent to the face of the latter, a protecting shield for said upwardly extending portion, and means on said shield for deflecting any droppings from the weld to one side of the bed.

4. In an electric welding machine, the combination with a bed provided with spaced slideways, a stationary electrode mounted on said bed, a carriage movable on said slideways and a cooperating electrode mounted on said carriage, of insulation between said bed and stationary electrode having a portion extending upward above said slideways adjacent to the face of said stationary electrode, and a combined shield and deflector arranged in front of the upwardly extending portion of said insulation adapted to protect the latter and to deflect any droppings from the weld to one side of the slideway.

FLOYD E. TAYLOR.

REFERENCES CITED

The following references are of record in the file of this patent:

UNITED STATES PATENTS

| Number | Name | Date |
| --- | --- | --- |
| 915,249 | Thompson | Mar. 16, 1909 |
| 1,493,656 | Von Henke | May 13, 1924 |
| 1,654,562 | Taylor | Jan. 3, 1928 |